United States Patent
Schäty

(10) Patent No.: US 7,150,438 B2
(45) Date of Patent: Dec. 19, 2006

(54) HOLDER FOR A BODY AND A FASTENING ASSEMBLY ASSOCIATED WITH SAID HOLDER

(75) Inventor: Harald Schäty, Wetzlar (DE)

(73) Assignee: Newfrey LLC, Newark, DE (US)

( * ) Notice: Subject to any disclaimer, the term of this patent is extended or adjusted under 35 U.S.C. 154(b) by 108 days.

(21) Appl. No.: 10/494,566

(22) PCT Filed: Nov. 7, 2002

(86) PCT No.: PCT/EP02/12443

§ 371 (c)(1),
(2), (4) Date: Oct. 13, 2004

(87) PCT Pub. No.: WO03/040603

PCT Pub. Date: May 15, 2003

(65) Prior Publication Data

US 2005/0061927 A1    Mar. 24, 2005

(30) Foreign Application Priority Data

Nov. 8, 2001    (DE) ................................ 101 55 735

(51) Int. Cl.
*F16L 3/12* (2006.01)
(52) U.S. Cl. ................................... 248/74.1
(58) Field of Classification Search ............... 248/74.1, 248/74.2, 74.3, 74.4, 313, 316.5
See application file for complete search history.

(56) References Cited

U.S. PATENT DOCUMENTS

| | | | |
|---|---|---|---|
| 4,029,276 A | 6/1977 | Zielie | |
| 6,592,083 B1* | 7/2003 | Hobson et al. | 248/74.3 |
| 6,598,836 B1* | 7/2003 | Leon | 248/74.1 |
| 2005/0201877 A1* | 9/2005 | Mitsudou | 417/423.14 |

FOREIGN PATENT DOCUMENTS

| | | | | |
|---|---|---|---|---|
| DE | 635 321 | | 9/1936 | |
| DE | 43 09 330 | * | 9/1994 | 248/74.1 |
| EP | 567 821 | * | 4/1993 | 248/74.1 |
| EP | 597 805 | * | 10/1993 | 248/74.1 |
| EP | 0 713 039 | | 5/1996 | |
| FR | 95 704 | | 4/1971 | |
| FR | 2630186 | * | 4/1988 | 248/74.1 |
| WO | WO 98/51953 | | 11/1998 | |

* cited by examiner

Primary Examiner—Ramon O Ramirez
(74) Attorney, Agent, or Firm—Miles & Stockbridge P.C.

(57) ABSTRACT

A holder (12; 60; 80; 102) is proposed for an object (14; 104), preferably for a fuel filter (104) for a motor vehicle, having two arms (24, 26; 62, 64; 82, 84; 112, 114) designed together to enclose the object (14; 104), the two arms being positively connected to each other at their respective first end by means of a first connection (28; 66; 116) and at their respective second end by means of a second connection (30; 68; 118), and having fastening means (52; 70; 72; 120) to fix the interconnected arms (24, 26; 62, 63; 82, 84; 112, 114) to a frame (16; 106), preferably to the motor vehicle.

Here the fastening means comprise an opening (52; 70; 72; 120) in the arms (24, 26; 62, 64; 82, 84; 112, 114) arranged in the region of the first connection (28; 66; 116), into which opening a fastening element (18; 86; 108) is introducible that is connectable to the frame (16; 106) and by means of which the first connection (28; 66; 116) can be secured against loosening.

14 Claims, 3 Drawing Sheets

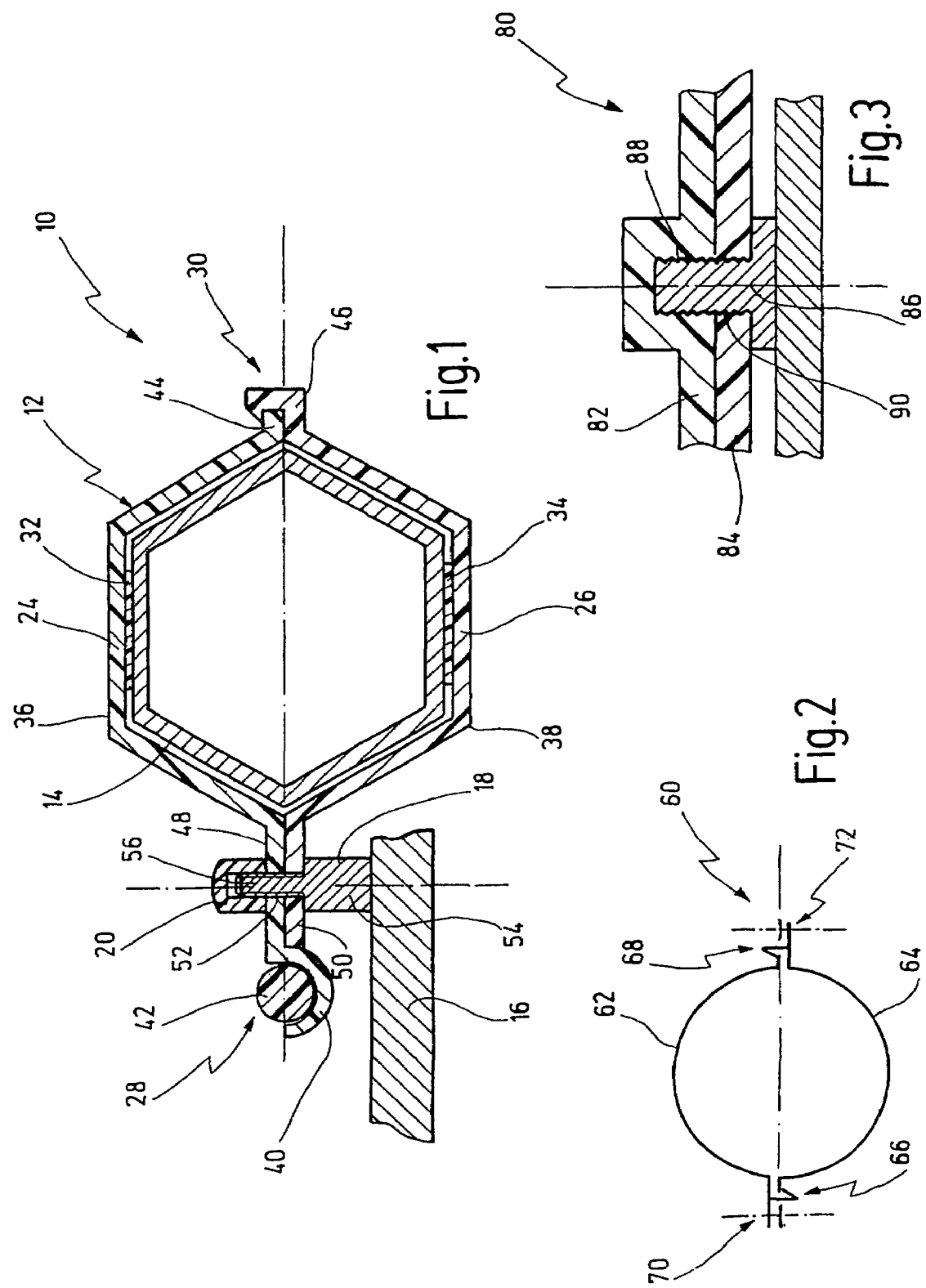

HOLDER FOR A BODY AND A FASTENING ASSEMBLY ASSOCIATED WITH SAID HOLDER

The present invention relates to a holder for an object, preferably for a fuel filter for a motor vehicle, having two arms together designed to enclose the object, the arms being positively connectable to each other at a first end of each by means of a first connection and at the second end of each by means of a second connection, and having fastening means of fixing the interconnected arms enclosing the object to a frame, preferably to the motor vehicle.

Further, the present invention relates to a fastening apparatus having a metal pin projecting relative to a metal sheet, to which pin a holder for an object is fixed.

Such holders and fastening apparatus are generally known.

Thus for example it is known that a holder for fuel filters may be configured as a multipartite clamp of steel sheet. This known holder, however, is comparatively expensive, and in the second place its installation involves considerable outlay.

In the known fastening apparatus initially mentioned, a metal pin is welded to a sheet of bodywork by so-called short-time electric arc welding, otherwise known as Bolzenschweilßen [stud welding]. The metal pins may be threaded bolts, T-bolts, so-called 'pinetree' bolts etc. Such bolts are universally usable. Various types of holders, in particular plastic "clips," may be fixed to these.

Against the above background, the problem to which the invention is addressed consists in specifying an improved holder for objects, preferably for plastic filters, and a correspondingly improved fastening apparatus.

This object is accomplished, in the case of the holder initially mentioned, in that the fastening means comprise an opening in the arms, arranged in the neighborhood of the first connection, into which opening a fastening member connectable to the frame is introducible, and by means of which the first connection can be secured against loosening.

In this way, it can be brought about that the first connection between the arms is secured against loosening, and moreover a connection of the holder with a frame can be effectively made.

Further, the above invention is solved by a fastening apparatus as initially mentioned, the holder being a holder according to the invention and the metal pin being inserted in the opening in the arms.

It is of especial advantage if the arms are each made of plastic.

In this way, the holder is producible considerably more economically than a holder having arms of sheet steel.

It is here especially preferred for the arms to be produced by the injection molding process.

It is especially preferred if means for production of the first or second connection of the arms are fabricated in a single shaping operation, in particular injection molding, so that the arms are non-detachably coupled to each other after the molding operation.

This will in particular reduce the number of parts of the holder. After the fabrication of the arms, these are non-detachably coupled to each other and consequently to be handled as one part.

Here it is especially preferred if the means for fabrication of the first or the second connection of the arms are configured as a joint produced together with the arms in a single shaping operation, in particular injection molding.

This embodiment makes possible firstly a reduction in number of parts of the holder. Besides, the means of non-detachably connecting the arms at the same time performs the function of an articulation for opening and closing the arms, so that the holder is more readily mountable on the object.

In particular, it is here especially preferred if an articulation forms the first connection and the second connection is an arrest connection.

Since in the holder according to the invention, the first connection can be secured against loosening by an opening in the arms, the first connection may advantageously be configured as an articulation produced together with the arms in a single shaping operation. True, such articulations are not perse suitable for supporting heavy loads. By virtue of the additional securing means in the form of the opening in the arms near the articulation, the holder as a whole can nevertheless assume comparatively heavy loads, and in particular support a fuel filter of a motor vehicle.

The second connection is here preferably an arrest connection, which may already be designed per se for heavy loads.

According to an alternative embodiment, the arms are produced in separate shaping operations, and the shapes of the two arms are identical.

In this embodiment also, the number of parts to be provided for logistically is reduced. True, the arms are not non-detachably coupled to each other after the shaping operation, and consequently the number of parts per se is greater. But since parts (the arms) are identical, costs of storage etc. are reduced.

Further, it is preferred if the arms on the side facing the object are at least partly equipped with a covering.

This makes it possible to select the material of the arms per se primarily according to considerations of strength. The choice of materials for the covering may be made very largely independently of this, and for example adapted to the surface of the object.

This is especially advantageous when, as mentioned above, the first connection is realized by an articulation and the second connection by an arrest connection.

For then it is possible to preassemble the holder with the object, the arms being locked around the object and the arrest connection locked. By means of a suitable choice of covering, it is possible to fix the holder to the object by friction.

This idea, independently of the mode of attachment and independently of whether the first connection can be secured against loosening, is regarded as the invention proper.

Here it is of especial advantage if the covering is made of a plastic, preferably more elastic than a material of which the arms are made.

Owing to the elasticity, it is possible to 'clamp in' the object into the holder in preassembled state. Besides, the covering then has a damping action, which is of advantage especially upon storage of an object on a movable or vibrating frame, such as a motor vehicle.

Further, it is preferred if the arms and the covering are produced in a single shaping operation, in particular a two-component injection molding operation.

The two-component injection molding technique is known per se. With it, it is possible to fix a comparatively elastic coating to the arms of a comparatively solid and hence inelastic material in a single shaping operation.

Upon the whole, it is preferred further if the opening to accommodate a fastening element is arranged between the first connection and the part of the arms enclosing the object.

This will ensure that the forces exerted by the object on the arms (e.g. by vibrations or the like) on the part of the first connection can be absorbed by the fastening means, so that the first connection as such is relieved vis-à-vis the said forces.

In the fastening apparatus according to the invention, it is of advantage if the opening is configured throughout through both arms, if the metal pin is a threaded bolt, in particular a coarse-threaded bolt, and if the holder is secured to the metal pin by a nut mounted on an end of the threaded bolt projecting relative to the opening.

In this apparatus, it is ensured that the arms are fixedly connected together in the vicinity of the first connection. The first connection is secured against loosening in this way.

It is here especially preferred if the nut is a plastic nut, preferably a glass-fiber reinforced plastic nut.

It will be understood that the features mentioned above and yet to be illustrated may be employed not only in the combination specified in each instance, but also in other combinations or by themselves, without departing from the scope of the present invention.

Embodiments of the invention are represented by way of example in the drawing and will be illustrated in more detail in the description to follow.

In the drawing,

FIG. 1 shows a schematic cross-sectional view of a first embodiment of a fastening apparatus according to the invention;

FIG. 2 shows a schematic representation of a holder according to the invention, in a second embodiment;

FIG. 3 shows a detail view of a fastening apparatus according to the invention in a third embodiment;

Figure 4:
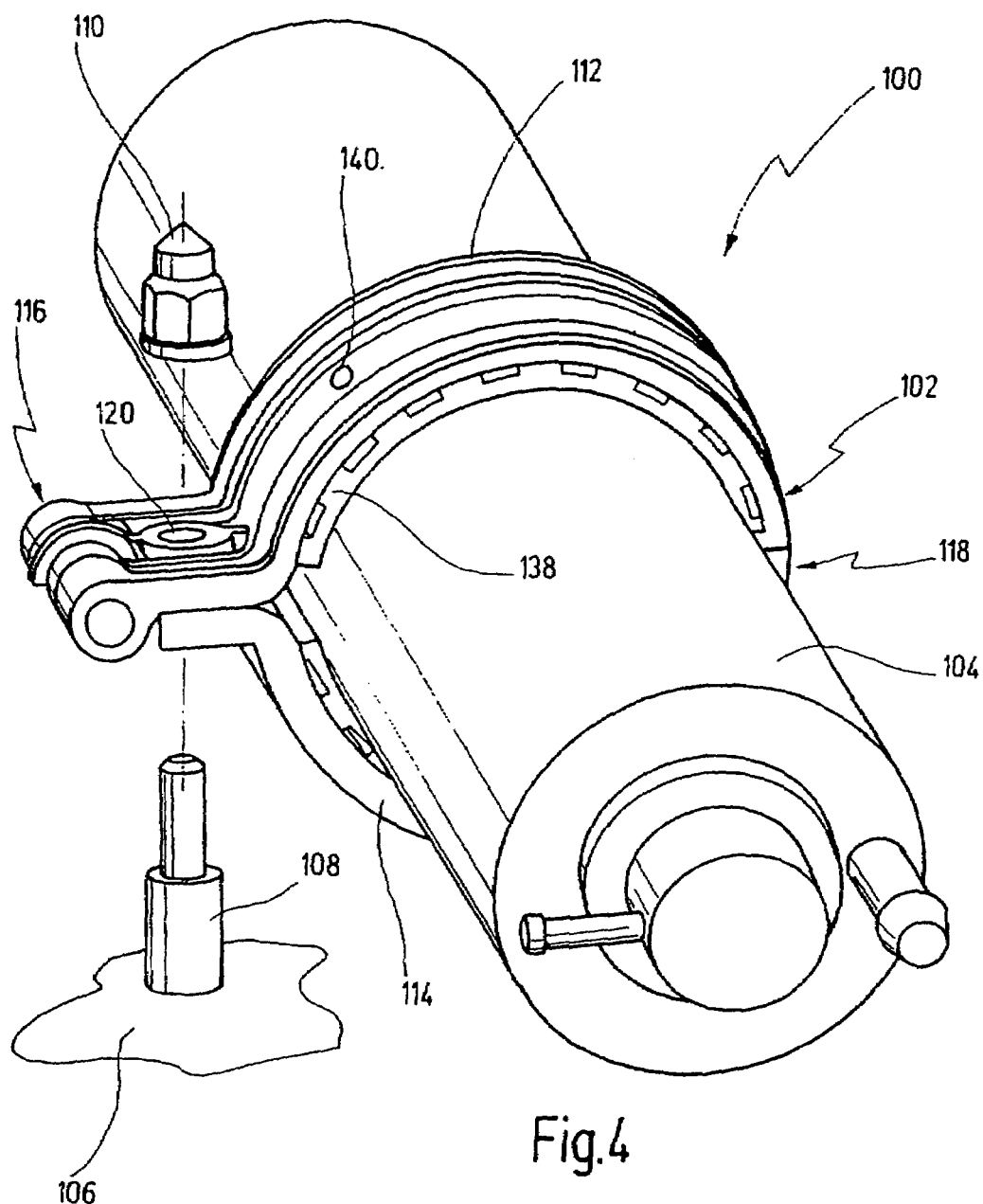
FIG. 4 shows a perspective view of a fastening apparatus according to a fourth embodiment, partly in exploded view.

In FIG. 1, a fastening apparatus according to a first embodiment of the invention is generally designated 10.

The fastening apparatus comprises a holder 12 for an object 14, in the form of a hexagonal tube.

The object 14 is placed by means of the holder 12 on a frame 16, e.g. a metal sheet. The fastening apparatus 10 comprises, for this purpose, a metal pin 18 welded onto the metal sheet 16 by stud welding. Further, the fastening apparatus 10 contains a plastic nut 20 fixing the holder 12 to the metal pin 18.

The plastic nut 20 may be a glass-fiber reinforced plastic nut.

The holder 12 comprises two arms 24, 26 each made of plastic, preferably the same plastic.

The two arms 24, 26 are connected to each other in the region of a first connection 28 in the form of an articulation and in the region of a second connection 30 in the form of an arrest connection.

The arms 24, 26 enclose the object 14. Here the first and second connections 28, 30 are spaced 180° apart, so that the two arms 24, 26 each enclose about half of the object 14. Alternatively, the first arm 24 may for example extend around the object 14 through 270°, the second arm 26 through only 90°.

The shape of the arms 24, 26, in the region of their grip segments 36, 38 enclosing the object 14 is adapted to the object 14. Thus each of the arms 24, 26, in the cross-sectional view represented in FIG. 1, has more or less the shape of a trapezoid with no base.

On the inside of the grip segments 36, 38, the arms 24, 26 are each provided with an elastic covering 32, 34. In the case of the holder 12, the elastic coverings 32, 34 are each provided only in a region of a portion of the grip segment 36, 38, to wit in such manner that the arms 24, 26 in closed condition elastically 'tense' the object 14 between them.

The arm 24 comprises a first connecting segment 40 more or less in the shape of a halved hollow cylinder. The arm 26 comprises a first connecting segment 42 in the shape of a solid cylinder of smaller diameter, rotatably arranged inside the halved hollow cylinder 40. In the connecting segment 40, an aperture not shown is provided, through which a web of the second arm 26 reaches, onto which the solid cylinder 42 is formed.

The connecting segments 40, 42 jointly form the first connection 28 in the shape of an articulation. The arms 24, 26 may be opened and closed by means of the articulation, in order to first pick up and then enclose the object 14.

The first arm 24 further comprises a second connecting segment 44 in the form of an arrest. The second arm 26 comprises a second connecting segment 46 in the form of an arrest hook. The arrest 44 is designed to engage the arrest hook 46. Consequently, the second connecting segment 44 and the second connecting segment 46 together form the second connection 30 in the shape of an arrest connection. The arrest connection is essentially loaded in tension, and may therefore comprise a high stability for this loading.

The object 14 having been introduced into the opened arms 24, 26 by means of the articulation 28, the arms 24, 26 can be closed around the object 14 until the arrest 44 engages the arrest hook 46. Here the elastic coverings 32, 34 tense the object 14 in between the arms 24, 26. Owing to the effect of friction between the coverings 32, 34 and the object 14, the holder 12 and the object 14 consequently form a preassembled unit, which can be stored as such and mounted as a whole.

The first arm 24, between its grip segment 36 and its first connecting segment 40, comprises a fastening segment 48. Correspondingly, the second arm 26 comprises a second fastening segment 50 between its grip segment 38 and its first connecting segment 42. The fastening segments 48, 50 are configured as straight webs, lying in contact with each other in the arrest condition of the second connection 30.

Both fastening segments 48, 50 are provided with flush through holes, so that a common opening 52 is formed, serving for attachment to the metal pin 18.

The metal pin 18 comprises a foot 54 and a threaded portion 56 projecting relative to the foot 54, with an outside diameter adapted to the inside diameter of the opening 52.

Consequently, the unit composed of holder 12 and object 14, preassembled in proper position, can be mounted on the sheet 16, in which the opening 52 is pushed onto the threaded portion 56, until the holder 12 is firmly in contact with the foot 54 of the metal pin 18. Then the plastic nut 20 is screwed or thrust onto the end, projecting relative to the opening 52, of the threaded portion 56, so that the fastening segments 48, 50 are firmly clamped between the end 54 of the metal pin 18 and the plastic nut 20.

Here the fastening segments 48, 50 may be spaced apart from each other, in which case they are under tension under the action of the plastic nut 20 and the elastic coverings 32, 34, to hold the object 14 securely. Preferably, however, the fastening segments 48, 50 in fastened condition lie in contact with each other, as shown in FIG. 1.

The connecting segments 40, 42 and 44, 46 are provided at the respective ends of the arms 24, 26. The term 'arm end,' however, is not intended to exclude the presence of still other attachments or the like at the ends in question, extending out beyond the connecting segments in question.

The shape of the grip segments 36, 38 is adapted to the shape of the particular object 14. It will be understood that for example in the case of a round tube as object 14, the grip segments 36, 38 will therefore be of more or less semicircular configuration.

The second connection 30, instead of an arrest connection, may alternatively be made up of some other geometrically positive connection, for example a connection with lock lever, a screw connection or the like. The first connection 28 may for example alternatively be a film hinge.

Instead of a metal pin 18 with foot 54, alternatively a simple bolt with a coarse thread may be used. In that case, for the purpose of spacing, it may be of advantage to inject a spacer onto the fastening segment 50.

FIG. 2 shows an alternative embodiment of a holder 60 according to the invention.

The holder 60 consists of two identical arms 62, 64, each made of plastic, but alternatively they may be made of metal.

The arms 62, 64 are set 180° apart and connected to each other at a first connection 66 and at a second connection 68, of identical configuration with the first connection 66.

In the embodiment shown by way of example, the connections 66, 68 are arrest connections, the arms 62, 64 each having an arrest hook at one end and an arrest depression at the other end.

Further, the connecting segments of the arms 62, 64 each comprise apertures, so that in the region of the first and second connections 66, 68, an opening 70, 72 is provided, as schematically indicated in FIG. 2. Consequently, the holder 16 may be fixed to a metal pin in each instance, either at the opening 70 or at the opening 72 or at both openings 70, 72, corresponding to the metal pin 18 of the first embodiment.

In the case of the holder 16, the openings 70, 72 each lie outside of the connections 66, 68. It will be understood, however, that preference is given to an arrangement of the openings 70, 72 between the respective connections 66, 68 and the grip segments, not more specifically designated, of the arms 62, 64.

FIG. 3 shows a detail view of another alternative embodiment of a fastening apparatus 80.

As in the case of the first embodiment, a holder, not more specifically designated, of the fastening apparatus 80 comprises a first and a second arm 82, 84, fixed to a metal pin 86.

The metal pin 86 is a so-called 'pinetree'-head pin having serrated circular projections.

In a fastening segment of the second arm 84, a through hole 90 matching the metal pin 86 is provided. In the fastening segment of the first arm 82, a blind hole 88 is provided, matching the metal pin 86.

In this embodiment, no separate plastic nut 20 is provided. Instead, the fastening segments of the arms 62, 84 are hammered onto the metal pin 86, so that the latter enters the holes 88, 90 and fixes itself there.

Although the first embodiment of FIG. 1 is definitely better in terms of stability of the fastening, the alternative embodiment shown in FIG. 3 is sufficient for some applications.

It will be understood that the holder, not more specifically designated, of the fastening apparatus 80 may comprise connecting and grip segments like the holder 12 of the first embodiment or the holder 60 of the second embodiment.

Figure 5:
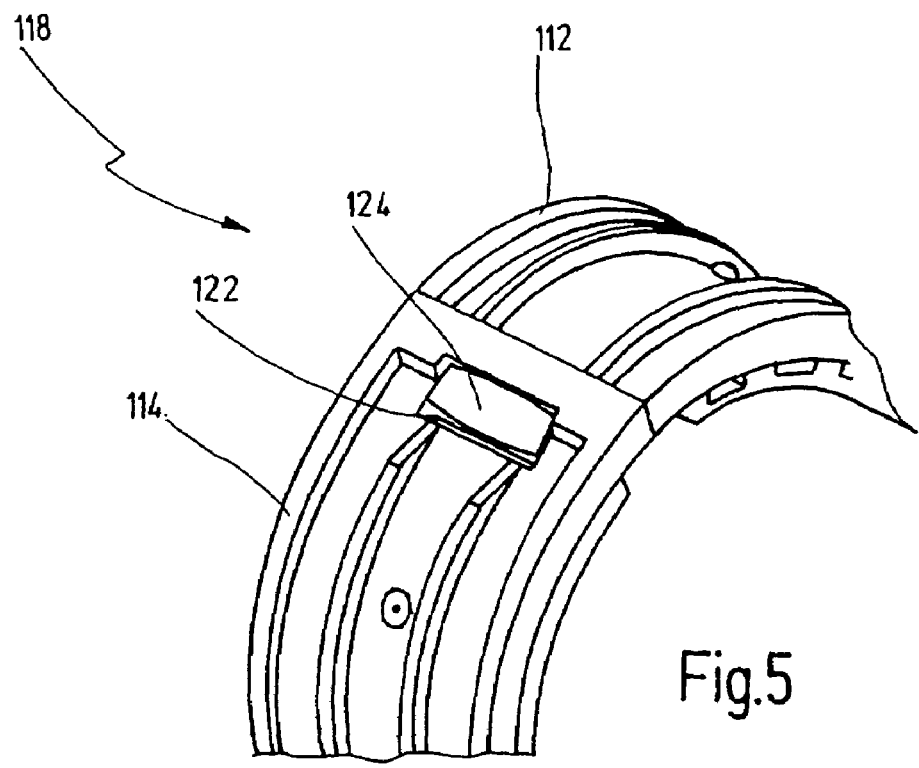
FIG. 5 shows a perspective detail view of an arrest connection of the holder of the fastening apparatus of FIG. 4; and, FIG. 6 shows a perspective detail view of the region of the first connection of the holder of the fastening apparatus of FIG. 4.
Figure 6:
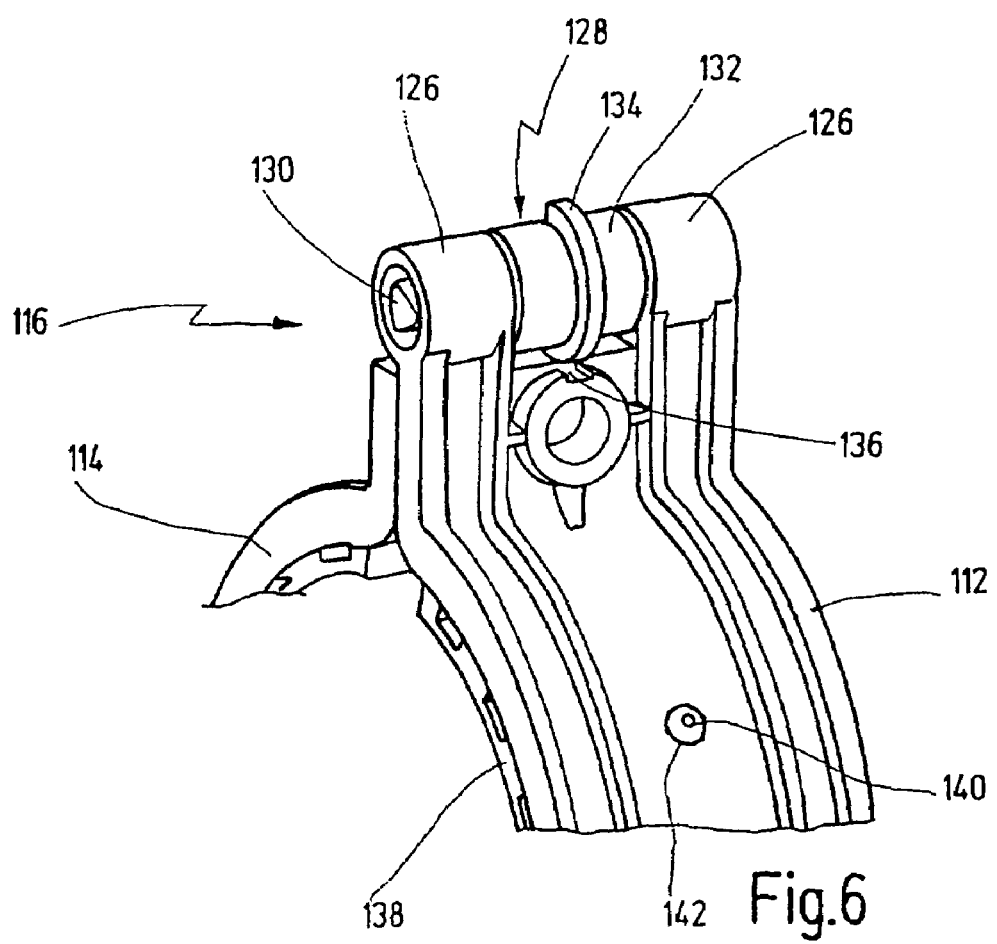

In FIGS. 4 to 6, an especially preferred embodiment of a fastening apparatus 100 is shown.

The fastening apparatus 100 comprises a holder 102 designed to fix a fuel filter 104 to a schematically indicated frame (bodywork sheet) 106.

The fastening apparatus 100 corresponds in many respects to the fastening apparatus 10 of the first embodiment. Hence the description of the fastening apparatus 10 applies for the most part also to the fastening apparatus 100. To avoid repetition, only the differences will be entered upon in detail here.

On the frame 106, as in the case of the first embodiment, a metal pin 108 is fixed by the stud welding method.

In common with a plastic nut 110, this serves to fix the holder 102 to the frame 106.

The holder 102 comprises a first arm 112 and a second arm 114, connected in the region of a first connection 116 and in the region of a second connection 118 to each other.

Between more or less semicircular grip segments, not more specifically designated, of the first and second arms 112, 114, and the first connection 116, an opening 120 is provided for the metal pin 108.

The opening 120 is provided by two aligned through holes in fastening segments of the arms 112, 113, and represents the only fastening location of the holder 102.

The second connection 118 is an arrest connection (FIG. 5) formed by an arrest 124 at the end of the arm 112 and a matching recess 122 at the opposed end of the arm 114.

The first connection 116, as shown in FIG. 6, is configured as an articulation.

The articulation 116 is produced together with the arms 112, 114 in an injection molding operation. The articulation 116 contains, at the end of the first arm 112, two loops 126, spaced apart. Further, the articulation 116 contains a T-pin at the end of the second arm 114. The T-pin ends 130 engage the spaced loops 126. A central part 132 of the T-pin lies between the loops 126, so that the arms 112, 114 are articularly coupled permanently to each other.

At the central portion 132 of the T-pin 128, a radially projecting guide rib 134 is further provided, engaging a guide groove 136 of matching configuration. The guide groove 136 is provided on the first arm 112 in the region between the loops 126. By the engagement of the guide rib 134 in the guide groove 136, the arms 112, 114 are prevented from being rotated about an axis oblique or perpendicular to the axis of articulation. Consequently, the articular connection 116 is thereby preserved.

Each of the arms 112, 114 is further provided with a plurality of holes 142 in the respective grip segments. The holes 142 are each engaged by anchors 140 of elastic coverings 138. The coverings 138 each comprise through surfaces and webs pointing to the filter 104 and pointing to the arms 112, 114. Consequently, between the arms 112, 114 and the through segments of the coverings 138, air chambers are formed, so that the coverings possess a high elasticity.

Also in the case of the fastening apparatus 100, the holder 102 may be preassembled in correct position to the fuel filter 104, so that fuel filter 104 and holder 102 form a preassembled unit, that can be handled and stored as another part.

The frictional contact between the coverings 138 and the filter 104 and the tension applied to the coverings 138 with arrest connection 118 closed, ensure that the holder 102 in preassembled condition does not slip relative to the filter 104.

The invention claimed is:

1. Holder (12; 60; 80; 102) for an object (14; 104), preferably for a fuel filter (104) for a motor vehicle, having two arms (24, 26; 62, 64; 82, 84; 112, 114) designed together to enclose the object (14; 104), the arms being positively connectable to each other at their respective first end by means of a first connection (28; 66; 116) and at their respective second end by means of a second connection (30; 68; 118), and having fastening means (52; 70; 72; 120) to fix the interconnected arms (24, 26; 62, 64; 82, 84; 112, 114) to a frame (16; 106), preferably to the motor vehicle, characterized in that the first connection forms an articulation that permits the arms to be opened and closed to receive and to enclose the object, and in that the fastening means comprise an opening (52; 70; 72; 120) in the arms (24, 26; 62, 64; 82, 84; 112, 114) arranged near the first connection (28; 66; 116) and remote from the second connection, into which opening a fastening element (18; 86; 108) is introducible that is connectable to the frame (16; 106) and by means of which the first connection (28; 66; 116) can be secured against loosening.

2. Holder according to claim 1, characterized in that the arms (24, 26; 62, 64; 82, 84; 112, 114) are each made of plastic.

3. Holder according to claim 2, characterized in that the arms (24, 26; 62, 64; 82, 84; 112, 114) are produced by the injection molding process.

4. Holder according to claim 2, characterized in that means (126, 128) to produce the first connection (116) of the arms (112, 114) are produced jointly with the arms (112, 114) in a single shaping operation, in particular an injection molding operation.

5. Holder according to claim 4, characterized in that the means (126, 128) of producing the first connection (116) of the arms (112, 114) are made up of articulation parts (126, 128) produced jointly with the arms (112, 114) in a single shaping operation, in particular an injection molding operation.

6. Holder according to claim 1, characterized in that the second connection (30; 118) is an arrest connection (44, 46; 122, 124).

7. Holder according to claim 1, characterized in that the arms (62, 64) are produced in separate shaping operations and in that the shape of the two arms (62, 64) is identical.

8. Holder according to claim 1, characterized in that the arms (24, 26; 112, 114) on their side towards the object (14; 104) are at least partly equipped with a covering (32, 34; 138).

9. Holder according to claim 8, characterized in that the covering (32, 34; 138) is made of a plastic, preferably more elastic than a material of which the arms (24, 26; 112, 114) are made.

10. Holder according to claim 8, characterized in that the arms (24, 26) and the covering (32, 34) are produced in a single shaping operation, in particular a two-component injection molding operation.

11. Holder according to claim 1, characterized in that the opening (52; 120) is arranged between the first connection (28; 116) and the part of the arms (24, 26; 112, 114) enclosing the object (14; 104).

12. Fastening apparatus (10; 100) having a metal pin (18; 86; 108) projecting relative to a metal sheet (16; 106) and fixed to a holder (12; 60; 80; 102) for an object (14; 104), characterized in that the holder is a holder (12; 60; 80; 102) according to claim 1 and the metal pin (18; 86; 108) is introduced into the opening (50; 70, 72; 120) in the arms (24, 26; 62, 64; 82, 84; 112, 114).

13. Fastening apparatus according to claim 12, characterized in that the opening (52; 120) is formed throughout by the two arms (24, 26; 112, 114), in that the metal pin (18; 108) is a threaded bolt (18; 108), in particular a coarse-threaded bolt, and in that the holder (12; 102) is secured to the metal pin (18; 108) by a nut (20; 110) placed on an end, projecting relative to the opening (52; 120), of the threaded bolt (18; 108).

14. Fastening apparatus according to claim 13, characterized in that the nut (20; 110) is a plastic nut, preferably a glass-fiber reinforced plastic nut.

* * * * *